(12) United States Patent
Hori

(10) Patent No.: US 6,324,151 B1
(45) Date of Patent: Nov. 27, 2001

(54) PART FIXING METHOD CAPABLE OF COSTING DOWN

(75) Inventor: Ken-ichi Hori, Kawasaki (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 09/448,792

(22) Filed: Nov. 23, 1999

(30) Foreign Application Priority Data

Nov. 27, 1998 (JP) .................................................. 10-337499

(51) Int. Cl.$^7$ ....................................................... G11B 7/09
(52) U.S. Cl. ............................................................. 369/244
(58) Field of Search .................................. 369/247, 219, 369/44.14, 44.16, 44.15, 244; 359/813, 823

(56) References Cited

U.S. PATENT DOCUMENTS

| | | | |
|---|---|---|---|
| 5,010,246 | 4/1991 | Tsuyuguchi et al. | 250/216 |
| 5,056,891 * | 10/1991 | Masunaga | 359/813 |
| 5,467,237 * | 11/1995 | Takahashi | 360/114 |
| 5,488,603 * | 1/1996 | Tomita et al. | 369/219 |
| 5,892,628 * | 4/1999 | Ikari | 359/813 |
| 6,038,088 * | 3/2000 | Ikegame | 359/823 |
| 6,046,866 * | 4/2000 | Ikegame | 359/823 |

FOREIGN PATENT DOCUMENTS

| | | |
|---|---|---|
| 0 444 850 A2 | 9/1991 | (EP) . |
| 0 650 161 A1 | 4/1995 | (EP) . |
| 0 714 226 A1 | 5/1996 | (EP) . |
| 6197519-A * | 7/1994 | (JP) . |

OTHER PUBLICATIONS

JPO machine English translation of Ikegame Tetsuo (JP6–197519).*

* cited by examiner

Primary Examiner—David L. Ometz
Assistant Examiner—Franklin D. Altman, III
(74) Attorney, Agent, or Firm—Frishauf, Holtz, Goodman, Langer & Chick, P.C.

(57) ABSTRACT

In a method of fixing a part on a main base, the method comprises the step of mechanically fixing the part on the main base by using solder. The main base preferably may be made of resin while the part preferably may be made of one where the solder enables to adhere to the part. The resin of the main base comprises, for example, a liquid-crystal polymer. The main base may comprise an optical base for use in an optical pickup. The part may comprise a leaf spring or a photodiode (PD) base to which a photodiode is adhered.

21 Claims, 5 Drawing Sheets

PART FIXING METHOD CAPABLE OF COSTING DOWN

BACKGROUND OF THE INVENTION

This invention relates to a part fixing method for fixing a part on a main base and, more particularly, to a part fixing method for fixing, on an optical base for use in an optical pickup, a part such as a leaf spring or a photodiode (PD) base to which a photodiode is adhered.

In the manner known in the art, an electric equipment such as a personal computer is connected to various peripheral units one of which comprises a memory device or a recording medium. In addition, there are various types of memory devices (recording media). In other words, the memory devices (recording media) are classified into removable media and non-removable media. On of the removable media comprises a compact disc recordable (CD-R). The compact disc recordable is an addible recording medium which is compatible with a compact disc read only memory (CR-ROM) or a compact disc-digital audio (CD-DA). Although to write information (data) in the CD-R requires an exclusive apparatus or a CD-R drive and a writing application, to read the information (data) from the CD-R may be carried out by using a CD-ROM drive. Although it is impossible to cancel the date once written, it is possible to frequently add data.

Various other removable media are already known. A compact disc-rewritable (CD-RW) is a compact disc which is capable of erasing data therefrom and of rewriting data therein many times.

Now, in order to write information (data) in the CD-R or the CD-RN and to read the information (data) from the CD-R or the CD-RN demands a recording/reproducing optical pickup requires for irradiating a laser beam on the CD-R or the CD-RW.

In general, the optical pickup of the type described comprises a laser optical source for outputting the laser beam and an optical system for guiding the outputted laser beam to a recording medium such as an optical disc. As described above, it is possible for the CD-R and the CD-RW to carry out not only reading of information but also writing of information. In the optical pickup for the CD-R and the CD-RW, it is necessary to change output or power of the laser beam outputted by the laser optical source either on reading of information or on writing of information. This is because writing of information is carried out by forming a pit in a recording layer of the optical disc by irradiating of the laser beam. Accordingly, the output of the laser beam on writing of information is larger than that on reading of information and is, for example, ten to twenty times as large as that on reading of information.

In the manner which will later be described in conjunction with FIGS. 4A. 4B, 5A, and 5B, the optical pickup comprises an optical base on which various parts are mounted and mechanically fixed. Among the parts, a metallic leaf spring or a metallic PD base to which a photodiode is adhered is mechanically fixed on the optical base by using one or more screws in prior art.

However, a conventional fixing method using the screw(s) involves problems in the manner which will presently be described. Firstly, it is difficult to cost down because of use of the screws. Secondly, a fastening torque control required to screw fastening is carried out. Thirdly, location slip on fixing may easily occur at a place required for precise positioning where the screws and ultraviolet (UV) curing resin are used together such as the PD base. This is because friction torque occurs due to fastening of the screw(s). Fourthly, it is difficult in the fixing method using the screw(s) to try positioning and fixing again in a case where the UV curing resin stiffens with presence of the location slip and it results in taking much time. Fifthly, it is difficult in a case of fixing the PD base on the optical base to easily carry out exchange of parts although only the photodiode is broken down.

SUMMARY OF THE INVENTION

It is therefore an object of this invention to provide a part fixing method which is capable of reducing the cost.

It is another object of this invention to provide a part fixing method of the type described, where it is not necessary to carry out torque control.

It is still another object of this invention to provide a part fixing method of the type described, which is capable of carrying out positioning and fixing precisely without location slip on fixing.

It Is yet another object of this invention to provide a part fixing method of the type described, which is capable of easily carrying out retry of positioning and fixing again although stiffening is made with presence of location slip.

It is a further object of this invention to provide a part fixing method of the type described, which is capable of easily carrying out exchange of a part although only the part is broken down.

Other objects of this invention will become clear as the description proceeds.

In order to resolve the above-mentioned problems due to the part fixing method using the screw(s) as described above, the present inventor strenuously studied how method is good. As a studied result, the present inventor reached a conclusion that the above-mentioned problems are resolved by mechanically fixing using solder in lieu of the screw(s).

On describing the gist of this invention, it is possible to be understood that a method is for fixing a part on a main base. According to an aspect of this invention, the above-mentioned method comprises the step of mechanically fixing the part on the main base by using solder.

In the above-mentioned method, the base preferably may be made of resin selected from the group consisting of a liquid crystal polymer (LCP), a polyether sulfone (PES), a polyether imide (PEI), and a polyphenylene sulfide (PPS). The resin of the main base may comprise a thermosetting resin such as an epoxy resin. The part preferably may be made of one where solder enables to adhere to the part. The part where the solder enables to adhere thereto may be made of material where solder enables to adhere thereto, for example, copper. The part where the solder enables to adhere thereto may be made of one where solder is plated. The main base may comprise, for example, an optical base for use in an optical pickup. The part may comprise, for example, a leaf spring or a photodiode (PD) base to which a photodiode is adhered.

DESCRIPTION OF THE PREFERRED EMBODIMENT

Figure 1:
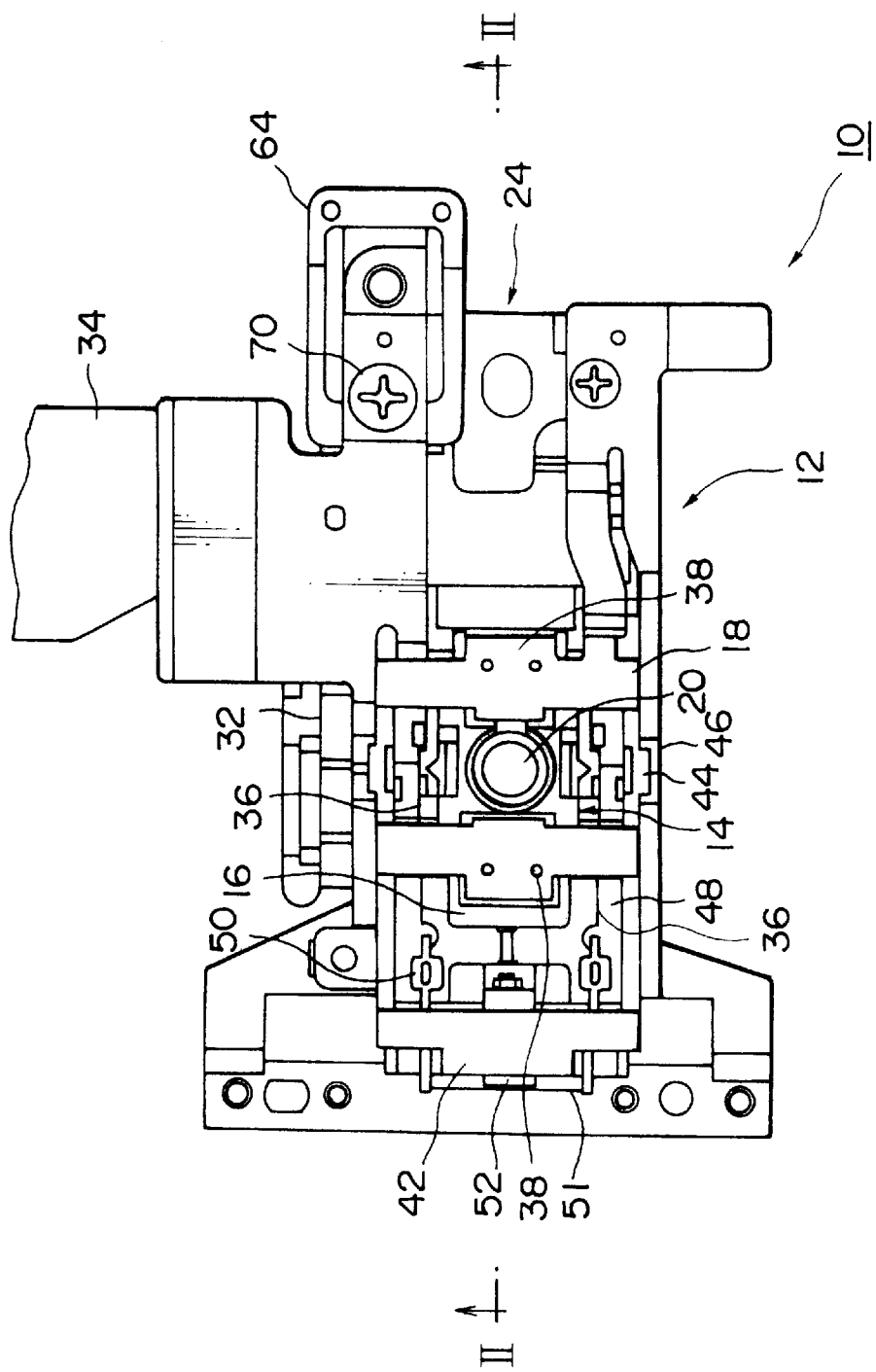
FIG. 1 is a plan view showing a conventional optical pickup.
Figure 2:
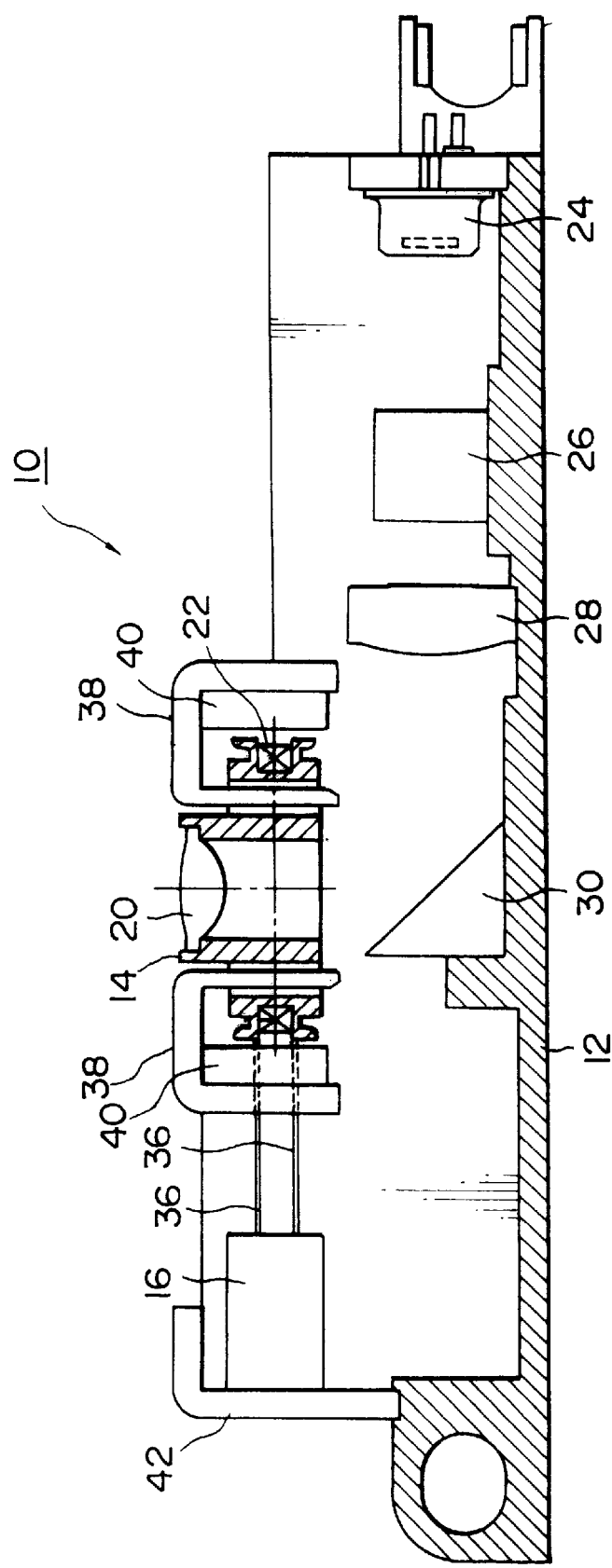
FIG. 2 is a cross-sectional view taken on line II—II on FIG. 1.

Referring to FIGS. 1 and 2, a conventional optical pickup 10 will be described at first in order to facilitate an understanding of the present invention. The illustrated optical pickup 10 is for use in an optical disc recording/reproducing apparatus such as a CD-R drive.

The optical pickup 10 comprises an optical base 12, a lens holder 14, a damper base 16, and an actuator base 18. The lens holder 14 holds an object lens 20 and is provided with a tracking coil (not shown) and a focusing coil 22. The actuator base 18 receives the lens holder 14 and the damper base 16.

The optical pickup 10 comprises a laser diode 24 serving as a laser light source for producing a laser beam. In addition, the optical pickup 10 further comprises an optical system which includes a diffraction grating (which will later become clear), a polarization beam splitter 26, a collimator lens 28, a quarter wavelength plate (which will later become clear), a rising mirror 30, the object lens 20, a sensor lens (which will later become clear), and a photodiode (which will later become clear). Produced by the laser diode 24, the laser beam passes through the diffraction grating, the polarization beam splitter 26, the collimator lens 28, the quarter wavelength plate, the rising mirror 30, and the object lens 20 and then is irradiated on an optical disc (CD-R) (which will later become clear). Reflected by the optical disc, a reflected laser beam passes through the object lens 20, the rising mirror 30, the quarter wavelength plate, the collimator lens 28, the polarization beam splitter 26, and the sensor lens and then is received in the photodiode. That is, the photodiode receives the reflected laser beam from the optical disc. In addition, arranged on an optical path of the laser beam, optical components and relationship thereamong will later be described with reference to FIG. 3.

The laser diode 24 and optical parts such as the polarization beam splitter 26 are held in or mounted on the optical base 12. In addition, the optical base 12 is slidably held in a chassis or frame (not shown) of the optical disc drive. The optical base 12 has a side surface on which a flexible circuit substrate 32 is fixed or mounted. The flexible circuit substrate 32 is connected to a flexible cable 34 through which the flexible circuit substrate 32 is electrically connected to other circuit elements (not shown) of the optical disc drive.

Between the lens holder 14 and the damper base 16 is connected by a plurality of suspension wires 36. A combination of the lens holder 14, the damper base 16, and the suspension wires 36 is received in the actuator base 18. The actuator base 18 has parts acting as yokes 38 on which permanent magnets 40 are fitted.

The actuator base 18 has a substantially frame structure made of metallic material. The substantially frame structure has an end serving as a receiving portion (not shown) for the damper base 16. The receiving portion comprises a supporting block 42 for fixing the damper base 16. The supporting block 42 is integrally formed with the actuator base 18. In addition, the substantially frame structure has both side walls which are provided with substantially semicircular projections 44. The substantially semicircular projections 44 are supported by supporting portions 46 provided in the optical base 12.

The damper base 16 is fitted with damper base covers 48 made of transparent resin material. The damper base covers 48 have rear portions serving as fixing portions 50 for fixing ends of the suspension wires 36. In a space between the damper base 16 and the damper base covers 48 is injected damping material (not shown) for suppressing vibrations of the suspension wires 36.

The damper base 16 has a rear wall which is provided with a flexible printed board 51 for connecting with end portions of the suspension wires 16 by solder. The damper base 16 is fixed between the both side walls of the actuator base 18 and the supporting block 42 with the damper base 16 inserted in a space therebetween.

The damper base 16 is attached on the supporting block 42 by a screw 52 with the supporting block 42 put between the damper base 16 and the screw 52. The damper base 16 is rotatable about the screw 52 as a center. This is for skew adjustment.

Before the damper base 16 is fixed on the actuator base 18, the suspension wires 36 are attached to the damper base 16. That is, the lens holder 14 and the damper base 16 are received in and fixed on the actuator base 18 in a state of an assembly where the lens holder 14 and the damper base 16 are connected by the suspension wires 36.

Figure 3:
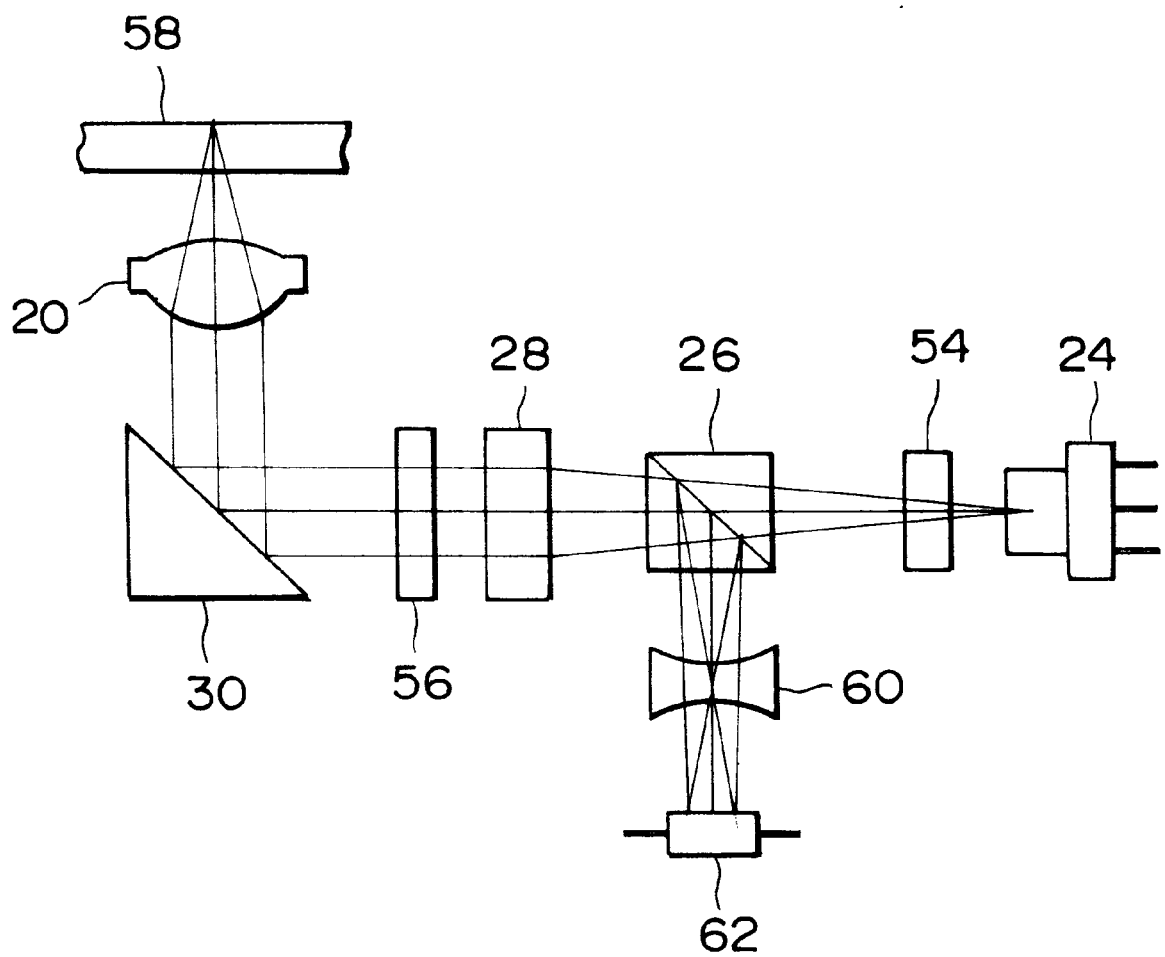
FIG. 3 is a schematic diagram of an optical system of the optical pickup illustrated in FIG. 1.

FIG. 3 illustrates the optical system of the optical pickup 10. The illustrated optical system comprises the laser diode 24, the diffraction grating depicted at 54, the polarization beam splitter 26, the collimator lens 28, the quarter wavelength plate depicted at 56, the rising mirror 30, the object lens 20, the optical disc depicted at 58, the sensor lens depicted at 60, and the photodiode depicted at 62.

Produced by the laser diode 24 to the left horizontally, one laser beam is separated by the diffraction grating 54 into three laser beams. The three laser beams passes through the polarization beam splitter 26 and thereafter converted by the collimator lens 28 into collimated laser beams. The collimated laser beams pass through the quarter wavelength plate 56 and then are orthogonally bent by the rising mirror 30 to go upwardly. Thereafter, the collimated laser beams are irradiated on the optical disc 58 through the object lens 20.

Reflected from the optical disc 58, reflected laser beams go downwardly, pass through the object lens 20, and are orthogonally bent by the rising mirror 30 to go to the right horizontally. The reflected laser beams pass the quarter wavelength plate 56 and are then converted by the collimator lens 28 into convergence laser beams. The convergence laser beams are orthgonally bent by the polarization beam splitter 26 to go in the forward direction horizontally. Thereafter, the convergence laser beams pass through the sensor lens 60 and are received in the photodiode 62.

Now, various parts are coupled to the optical base 12. Among the parts, parts such as a metallic leaf spring and a metallic PD base to which the photodiode 62 is adhered are fixed using screw(s) in the manner which will later be described. In addition, the metallic PD base is put under the flexible cable 34 in FIG. 1 and is fixed on one outer side wall of the optical base 12. The metallic PD base is not illustrated in FIG. 1 because the metallic PD base is covered by the flexible cable 34. On the other hand, the metallic leaf spring is depicted at 64 in FIG. 1.

Figure 4A:
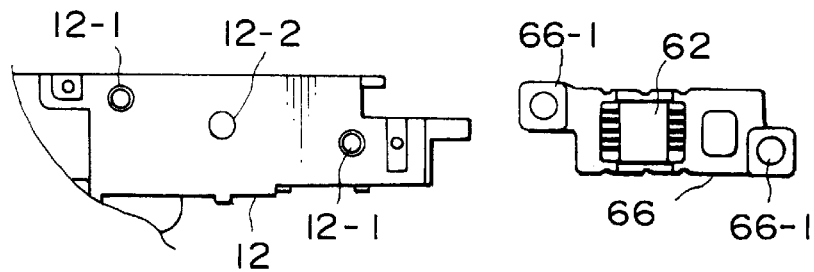
FIGS. 4A and 4B collectively show a part of an optical base for use in describing a conventional fixing method.
Figure 4B:
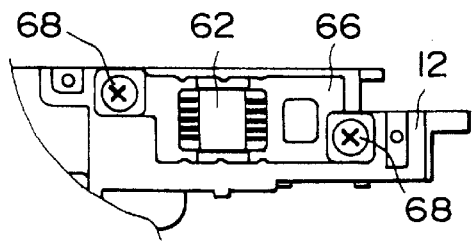

Referring now to FIGS. 4A and 4B, the description will proceed to a conventional fixing method for fixing the metallic PD base depicted at 66 on the optical base 12. FIG. 4A shows a state before the metallic PD base 66 is fixed on the optical base 12 while FIG. 4B shows a state after the metallic PD base 66 is fixed on the optical base 12.

As shown in FIG. 4A, the optical base 12 has two screw holes 12-1 for attaching the metallic PD base 66. In addition, the metallic PD base 66 has two through holes 66-1 at positions which correspond to the two screw holes 12-1. The two screw holes 12-1 are for passing two screws, which will later be described, therethrough. In addition, the optical base 12 has a through hole 12-2 for passing the laser beam from the sensor lens 60 (FIG. 3) therethrough.

As shown in FIG. 4B, the metallic PD base 66 is mechanically fixed on the optical base 12 by threading the two screws depicted at 68 through the two through holes 66-1 and the two screw holes 12-1. In addition, if necessary, UV curing resin (not shown) serving as an adhesive is applied to a space between the optical base 12 and the metallic PD base 66 to solidify the UV curing resin by irradiating ultraviolet rays to the UV curing resin.

Figure 5A:
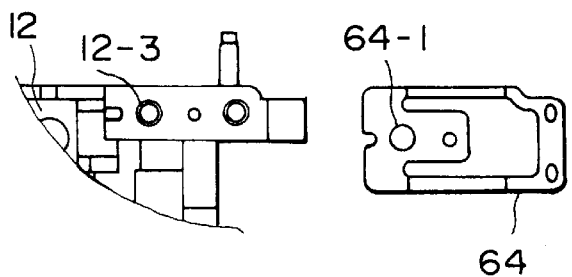
FIGS. 5A and 5B collectively show a part of an optical base for use in describing another conventional fixing method.
Figure 5B:
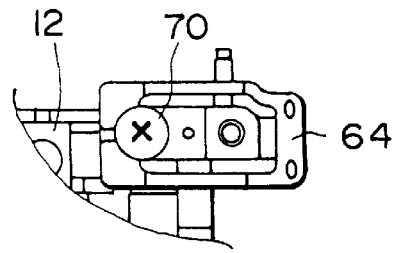

Referring now to FIGS. 5A and 5B, the description will proceed to another conventional fixing method for fixing the metallic leaf spring 64 on the optical base 12. FIG. 5A shows a state before the metallic leaf spring 64 is fixed on the optical base 12 while FIG. 5B shows a state after the metallic leaf spring 64 is fixed on the optical base 12.

As shown in FIG. 5A, the optical base 12 has a screw hole 12-3 for attaching the metallic leaf spring 64 thereto. The metallic leaf spring 64 has a through hole 64-1 for passing a screw, which will later be described, therethrough.

As shown in FIG. 5B, the metallic leaf spring 64 is mechanically fixed on the optical base 12 by threading the screw depicted at 70 through the through hole 64-1 and the screw hole 12-3.

However, the above-mentioned conventional fixing methods using the screw(s) involve problems, as mentioned in the preamble of the instant specification. Specifically, firstly, it is difficult to cost down because of use of the screws 68 and 70. Secondly, a fastening torque control required to screw fastening is carried out. Thirdly, location slip on fixing may easily occur at a place required for precise positioning where the screws 68 and the UV curing resin are used together such as the PD base 66. This is because friction torque occurs due to fastening of the screws 68. Fourthly, it is difficult in the fixing method using the screws 68 to try positioning and fixing again in a case where the UV curing resin stiffens with presence of the location slip and it results in taking much time. Fifthly, it is difficult in a case of fixing the PD base 66 on the optical base 12 to easily carry out exchange of parts although only the photodiode 62 is broken down.

Figure 6A:
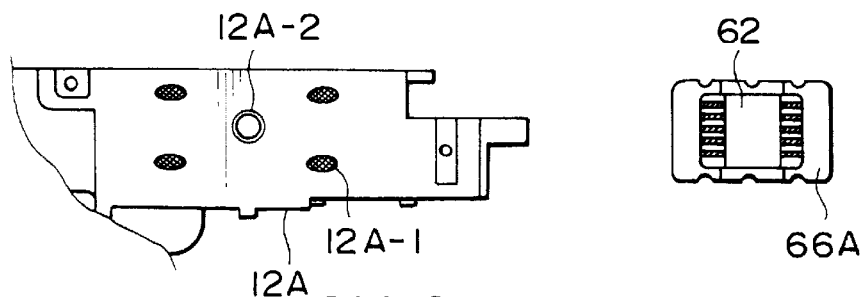
FIGS. 6A and 6B collectively show a part of an optical base for use in describing a fixing method according to a first embodiment of this invention.
Figure 6B:
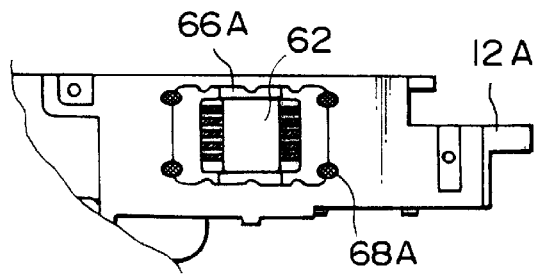

Referring now to FIGS. 6A and 6B, the description will proceed to a fixing method according to a first embodiment of this invention for fixing a PD base 66A on an optical base 12A. FIG. 6A shows a state before the PD base 66A is fixed on the optical base 12A while FIG. 6B shows a state after the PD base 66A is fixed on the optical base 12A.

Referring first to FIG. 6A, the optical base 12A is made of resin such as a liquid crystal polymer (LCP). Four lands 12A-1 are formed on the optical base 12A at four fixing positions for the PD base 66A. Each land 12A-1 is made of gold plating. In addition, the optical base 12A has a through hole 12A-2 for passing the laser beam from the sensor lens 60 (FIG. 3) therethrough.

The PC base 66A is made of material where solder enables to adhere thereto. Such as material where the solder enables to adhered is, for example, copper. In place of the material where the solder enables to adhere, the PD base 66A may be made of one where solder is plated.

As shown in FIG. 6B, at the four positions where the above-mentioned four lands are formed, the PD base 66A is mechanically fixed on the optical base 12A by using solder 68A.

Figure 7A:
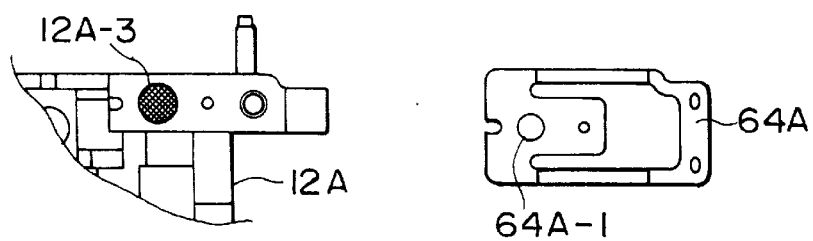
FIG. 7A and 7B collectively show a part of an optical base for use in describing a fixing method according to a second embodiment of this invention.
Figure 7B:
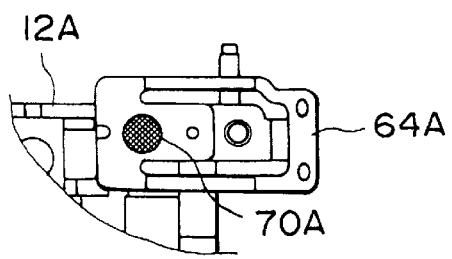

Referring now to FIGS. 7A and 7B, the description will proceed to another fixing method according a second embodiment of this invention for fixing a leaf spring 64A on the optical base 12A. FIG. 7A shows a state before the leaf spring 64A is fixed on the optical base 12A while FIG. 7B shows a state after the leaf spring 64A is fixed on the optical base 12A.

As shown in FIG. 7A, a land 12A-3 made of gold plating is formed on the optical base 12A at a fixing position for the lead spring 64A. In the manner as the PD base 66A, the leaf spring 64A is made of material where solder enables to adhere thereto, for example, copper. Instead of the material where the solder enables to adhere, the leaf spring 64A may be made of one where solder is plated. In addition, the leaf spring 64A has a through hole 64A-1 for fixing using solder which will presently be described.

Turning to FIG. 7B, the leaf spring 64A is mechanically fixed on the optical base 12A by using the solder depicted at 70A through the through hole 64A-1.

In the manner which is described above, in this invention, the parts are mechanically fixed on the main base by using molded interconnect device (MID) techniques. The MID means a circuit device in three-dimensional shape where conductive circuits are directly formed on a plastic molded article.

With the part fixing method according to this invention, it is possible to cost down because of use of the solder in lieu of the screws and it is unnecessary to carry out a fastening torque control required to screw fastening. In addition, it is possible to carry out positioning and fixing exactly at a place required for precise positioning where the PD base 66A is fixed. This is because friction torque does not occur due to fastening of the screw(s) and location slip on fixing hardly occurs.

In addition, inasmuch as fixing is made by using solder which is different from fixing using the UV curing resin, it is possible to easily carry out exchange of parts by heating a fixed portion to melt the solder. Accordingly, although fixing is made with presence of location slip, it is possible to easily try positioning and fixing again. It is therefore possible to easily carry out exchange of parts although only the photodiode 62 is broken down. As a result, it is possible to effectively use the parts without a waste.

While this invention has thus far been described in conjunction with preferred embodiments thereof, it will now be readily possible for those skilled in the art to put this invention into various other manners. For example, the parts to be fixed on the main base may not be restricted to the above-mentioned ones. In addition, the resin of the main base may comprise a polyether sulfone (PES), a polyether imide (PEI), or a polyphenylene sulfide (PPS). Furthermore, the resin of the main base may comprise a thermosetting resin such as an epoxy resin.

What is claimed is:

1. A method of fixing a part on an optical base for use in an optical pickup, said optical base having a plurality of lands, said part comprising a photodiode (PD) base to which a photodiode is adhered, said method comprising the step of mechanically fixing said PD base on said optical base at said lands by using solder.

2. A method as claimed in claim 1, wherein said optical base is made of resin, said PD base being adapted to be soldered.

3. A method as claimed in claim 2, wherein said resin of said optical base is selected from the group consisting of a liquid crystal polymer (LCP), a polyether sulfone (PES), a polyether imide (PEI), and a polyphenylene sulfide (PPS).

4. A method as claimed in claim 2, wherein said resin of said optical base comprises a thermosetting resin.

5. A method as claimed in claim 2, wherein said PD base comprises a material wherein solder adheres thereto.

6. A method as claimed in claim 5, wherein said material of said PD base comprises copper.

7. A method as claimed in claim 2, wherein said PD base is plated by soldering.

8. An optical pickup comprising:

an optical base having a plurality of lands;

a part mounted on said optical base, said part comprising a photodiode (PD) base to which a photodiode is adhered; and solder for mechanically fixing said PD base on said optical base at said lands.

9. An optical pickup as claimed in claim 8, wherein said optical base is made of resin, said PD base being adapted to be soldered.

10. An optical pickup as claimed in claim 9, wherein said resin of said optical base is selected from the group consisting of a liquid crystal polymer (LCP), a polyether sulfone (PES), a polyether imide (PEI), and a polyphenylene sulfide (PPS).

11. An optical pickup as claimed in claim 9, wherein said resin of said optical base comprises a thermosetting resin.

12. An optical pickup as claimed in claim 9, wherein said PD base comprises a material wherein solder adheres thereto.

13. An optical pickup as claimed in claim 12, wherein said material of said PD base comprises copper.

14. An optical pickup as claimed in claim 9, wherein said PD base is plated by soldering.

15. An optical pickup comprising:

an optical base having a plurality of lands; and a part mounted on said optical base, said part comprising a photodiode (PD) base to which a photodiode is adhered, said PD base being mechanically fixed on said optical base at said lands by solder.

16. An optical pickup as claimed in claim 15, wherein said optical base is made of resin, said PD base being adapted to be soldered.

17. An optical pickup as claimed in claim 16, wherein said resin of said optical base is selected from the group consisting of a liquid crystal polymer (LCP), a polyether sulfone (PES), a polyether imide (PEI), and a polyphenylene sulfide (PPS).

18. An optical pickup as claimed in claim 16, wherein said resin of said optical base comprises a thermosetting resin.

19. An optical pickup as claimed in claim 16, wherein said PD base comprises a material wherein solder adheres thereto.

20. An optical pickup as claimed in claim 19, wherein of said PD base comprises copper.

21. An optical pickup as claimed in claim 16, wherein said PD base is plated by soldering.

* * * * *